United States Patent [19]

Miller

[11] Patent Number: 4,658,948

[45] Date of Patent: Apr. 21, 1987

[54] MATERIAL TRANSFER ASSEMBLY

[75] Inventor: Charles P. Miller, McHenry, Ill.

[73] Assignee: Miller Formless Co., McHenry, Ill.

[21] Appl. No.: 705,545

[22] Filed: Feb. 26, 1985

Related U.S. Application Data

[63] Continuation-in-part of Ser. No. 581,284, Feb. 17, 1984, Pat. No. 4,605,116, which is a continuation-in-part of Ser. No. 672,151, Nov. 16, 1984, abandoned, which is a continuation of Ser. No. 414,383, Sep. 2, 1982, abandoned.

[51] Int. Cl.$^4$ ............................................. B65G 47/46
[52] U.S. Cl. ..................... 198/364; 198/535; 198/860.5; 414/141
[58] Field of Search ............ 198/364, 535, 536, 860.5; 193/25 C, 25 S; 414/141, 144, 145

[56] References Cited

U.S. PATENT DOCUMENTS 3,738,464 6/1973 Ortlip et al. ...................... 193/25 C
4,234,075 11/1980 Tingskog ...................... 198/860.5 X

FOREIGN PATENT DOCUMENTS 0556023 8/1932 Fed. Rep. of Germany ... 198/860.5
2457214 1/1981 France ................................. 414/141

Primary Examiner—Robert J. Spar
Assistant Examiner—Lyle Kimms
Attorney, Agent, or Firm—Neuman, Williams, Anderson & Olson

[57] ABSTRACT

A material transfer assembly is provided which includes a carriage of an unloading apparatus which is movable along a fixed, elongated conveyor housing. The carriage includes a funnel plate with an opening through which powdered material discharges through a flexible conduit and into a separate discharge guide which the carriage pulls along with it. The discharge guide maintains sliding engagement with the conveyor housing to provide closed conduit conveyance of the material into the conveyor housing. Hydraulic jacks pivotally mounted between the discharge guide and the carriage suspend the guide from the carriage, and towing chains connected to these two structures transmit pulling forces from the carriage to the guide so that the guide may move relative to the carriage to maintain the desired engagement with the conveyor housing despite variations in alignment between the carriage path and the conveyor as the carriage and guide move along the conveyor.

11 Claims, 6 Drawing Figures

FIG. 4
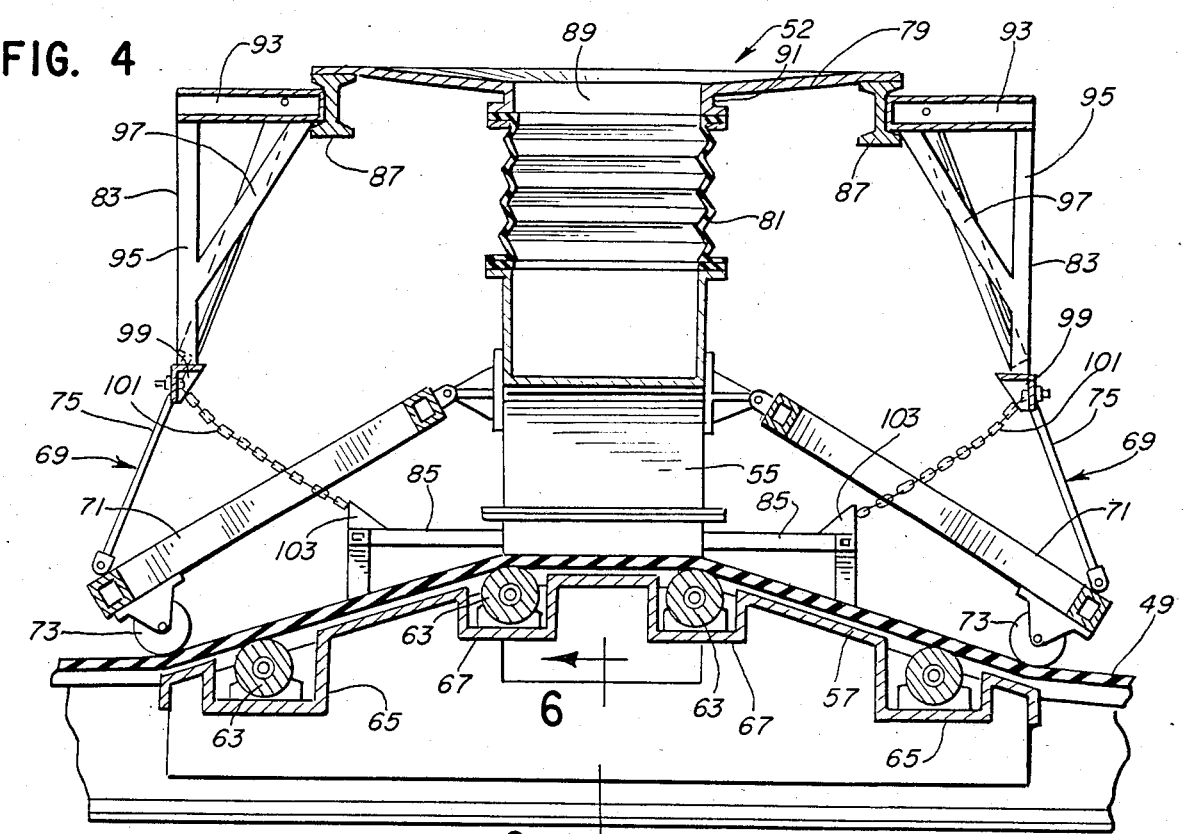
FIG. 5
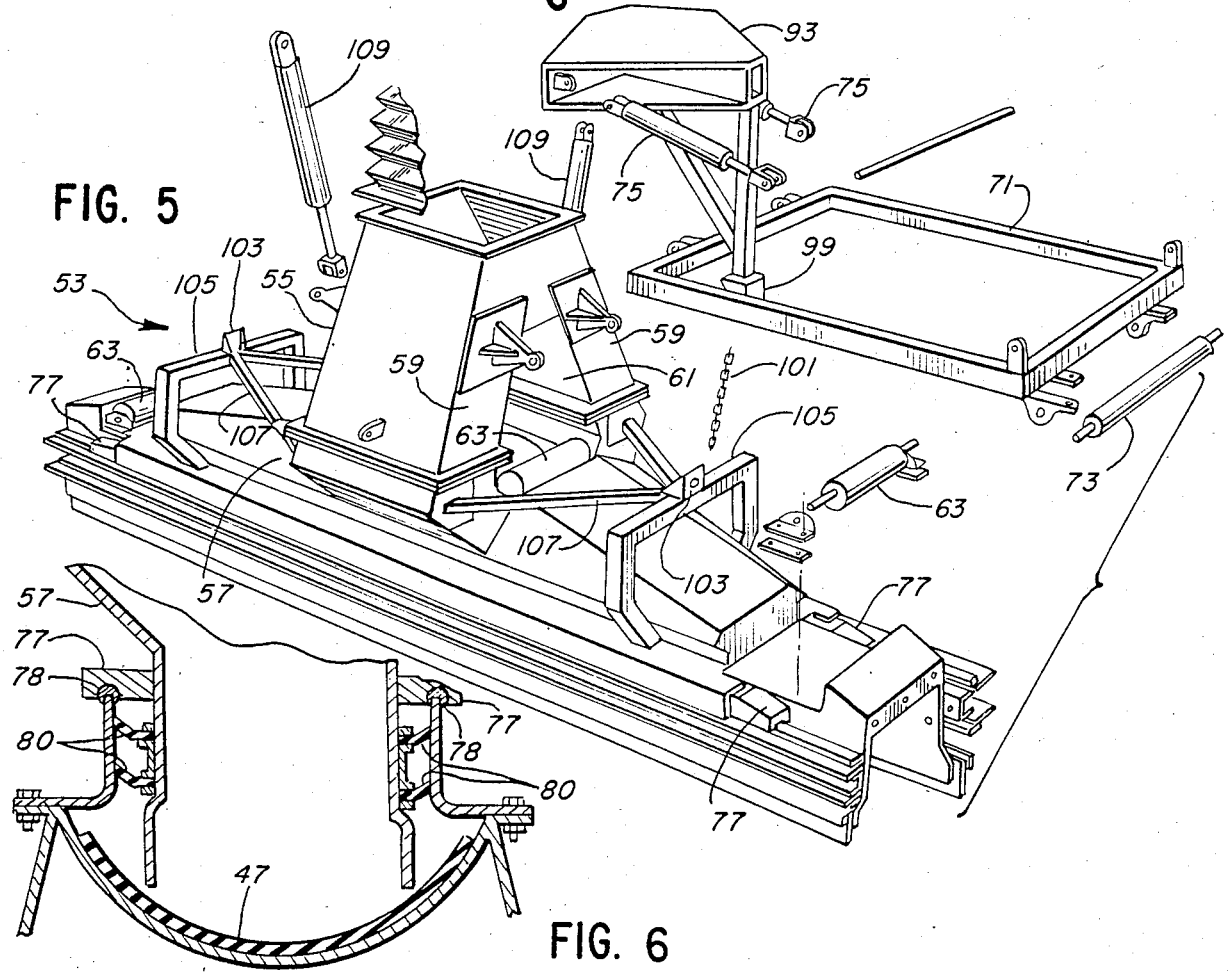
FIG. 6

MATERIAL TRANSFER ASSEMBLY

CROSS REFERENCE TO RELATED APPLICATION

This application is a continuation-in-part of application Ser. No. 581,284, filed Feb. 17, 1984, for a "Conveyor System Used With Apparatus For Unloading Comminuted Materials", now U.S. Pat. No. 4,605,116. application Ser. No. 581,284 is a continuation-in-part of copending application Ser. No. 672,151, (now abandoned) filed Nov. 16, 1984, for an "Apparatus And Method For Unloading Bulk Materials". Application Ser. No. 672,151 is a continuation of application Ser. No. 414,383 (now abandoned) filed Sept. 2, 1982. Application Ser. No. 848,907 filed Apr. 4, 1986 is a conintuation of application Ser. No. 672,151.

BACKGROUND OF THE INVENTION

1. Field of the Invention

The present invention relates to a material transfer assembly used in conjunction with a conveyor system and an unloading apparatus to transfer bulk materials from relatively large cargo containers or vessels to a material transport, handling or storage system. More particularly, this invention relates to a transfer assembly used in conjunction with an unloading apparatus and a conveyor system to transfer dry cement or other powdered material from the unloading apparatus to a material transport, handling or storage system.

The transfer of various bulk materials presents difficult problems; however, bulk cement, because of its physical properties, is particularly troublesome. Dry cement is a fine powdered material, 100 mesh or under in size. It is mildly abrasive, and it flows relatively freely at an angle of repose of 30° to 45°. When aerated it becomes fluid-like, but when packed or settled, it becomes dense and difficult to handle. It has strong adhesive properties when combined with water, and it deteriorates drastically when exposed to moisture. Once properly mixed, it sets and hardens very quickly.

When the cement is in its fluffy, aerated condition, it poses unique handling and transport problems. If the container used to hold the cement or the system used to transport it are open to the elements, the wind blows away the dust-like particles of cement. In addition to the loss of the product, cement particles in the air present a number of problems. They create a harsh environment which accelerates the wear of equipment and creates a health hazard to people who must work in this environment.

If the containers or transport system are open to moisture, the cement will combine with the water, set and quickly harden into a solid mass. When it combines with water, but before it hardens, cement has strong adhesive properties, and in this state it may adhere to the equipment, resulting in wear or failure of the equipment and in undesirable and expensive downtime. Cement which has combined with water and set is waste material requiring disposal. The cost of lost material and disposal is also an undesirable expense.

2. Description of the Prior Art

In view of the material handling parameters outlined above, a material transfer assembly for a mobile unloading apparatus which transfers bulk material from a vessel into a conveyor disposed within a fixed and closed housing should include the following features. The transfer assembly must provide a closed conduit which will transfer bulk material from the unloading apparatus to the conveyor without exposing it to the elements or allowing it to come into contact with other equipment. The assembly should move along with the unloading apparatus to reduce the extent of movement and the duration of operation of the unloading apparatus, thus reducing wear of the equipment, fuel consumption and ultimately, the expense of operation. In addition, the transfer assembly should be flexible so that the unloading apparatus may operate smoothly, without interruption and without damaging any related components. Added flexibility would reduce the need for strict requirements and precise tolerances, minimizing the expense of manufacture and assembly. It would allow the transfer assembly to accommodate variations in the relative positioning of the mobile unloading apparatus and the fixed conveyor. Accurate positioning of the unloading apparatus relative to the conveyor greatly increases the expense of manufacture and assembly.

The transfer assembly of the present invention, used in conjunction with a mobile unloading apparatus and a conveyor with a flexible cover, fulfills these requirements. It is simple, flexible, durable, and mobile. It allows the unloading apparatus to locally displace the flexible conveyor cover at the point of deposit and to deposit cement anywhere along the length of the conveyor regardless of variations in alignment between the receiving conveyor and the carriage path.

OBJECTS OF THE INVENTION

It is an object of the present invention to provide a material transfer assembly which fulfills the requirements stated above.

It is a further object of this invention to provide an improved material transfer assembly for a mobile unloading apparatus which transfers cement from a vessel into a conveyor disposed within a fixed, closed housing.

It is another object of this invention to provide a material transfer assembly with a simple, durable, and flexible construction.

It is yet another object of this invention to provide an improved material transfer assembly for a mobile unloading apparatus which allows the unloading apparatus to move along an elongated conveyor housing and to deposit pulverized material on a conveyor disposed within the housing.

It is a more specific object of this invention to provide such a transfer assembly which maintains a closed transfer conduit path between a movable apparatus and a closed conveyor disposed in a predetermined position along the path of movement of the apparatus, without requiring accurate positioning of the unloading apparatus relative to the conveyor.

It is a further object of this invention to provide such a transfer assembly which conveniently accommodates variations in the relative positions of a movable unloading apparatus and a fixed conveyor.

Other objects, advantages and features of the present invention will become apparent upon reading the following detailed description and appended claims, and upon reference to the accompanying drawings.

SUMMARY OF THE INVENTION

In accordance with one embodiment of this invention, a material transfer assembly which achieves the foregoing objects includes a carriage means of an unloading apparatus movable along a fixed, elongated conveyor housing containing a conveyor capable of transporting powdered material from one location to another. The carriage means includes an opening through which the carriage means discharges or funnels powdered material collected by the carriage means into a flexible conduit which communicates with the discharge opening. The flexible conduit also communicates with a discharge guide mechanism. The discharge guide has its bottom portion disposed within the conveyor housing, and it moves along with the carriage means and discharges the powdered material on the conveyor in the conveyor housing.

Flexible connection means comprising a number of hydraulic jacks having one of their ends pivotally mounted to the carriage means and the other to the discharge guide suspend the discharge guide from the carriage means. This suspending means provides great flexibility to the assembly, especially when used in conjunction with the flexible conduit.

The material transfer assembly also includes flexible towing means which allow the carriage means to pull or tow the discharge guide in either direction in which it moves along the conveyor. This towing means may be chains or similar devices each having one of their ends secured to the carriage means and the other to the discharge guide and having some slack for flexibility.

The assembly includes stops secured to the side of the discharge guide which engage the conveyor housing to prevent the guide from moving too deeply into the conveyor housing and from disrupting the operation of the conveyor.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 4 is sectional view taken along line 4—4 of FIG. 3.

FIG. 5 is a partial exploded view of the apparatus of FIGS. 3 and 4.

FIG. 6 is a sectional view taken along line 6—6 of FIG. 4.

While the applicant will describe the invention in connection with a preferred embodiment it will be understood that the invention is not limited to this embodiment. Furthermore, it should be understood that the drawings are not to scale and that the embodiments are illustrated by graphic symbols, diagrammatic representations and fragmentary views. In certain instances, the applicant may have omitted details which are not necessary for an understanding of the present invention such as conventional details of fabrication and assembly.

DETAILED DESCRIPTION OF THE DRAWINGS AND A PREFERRED EMBODIMENT

Figure 1:
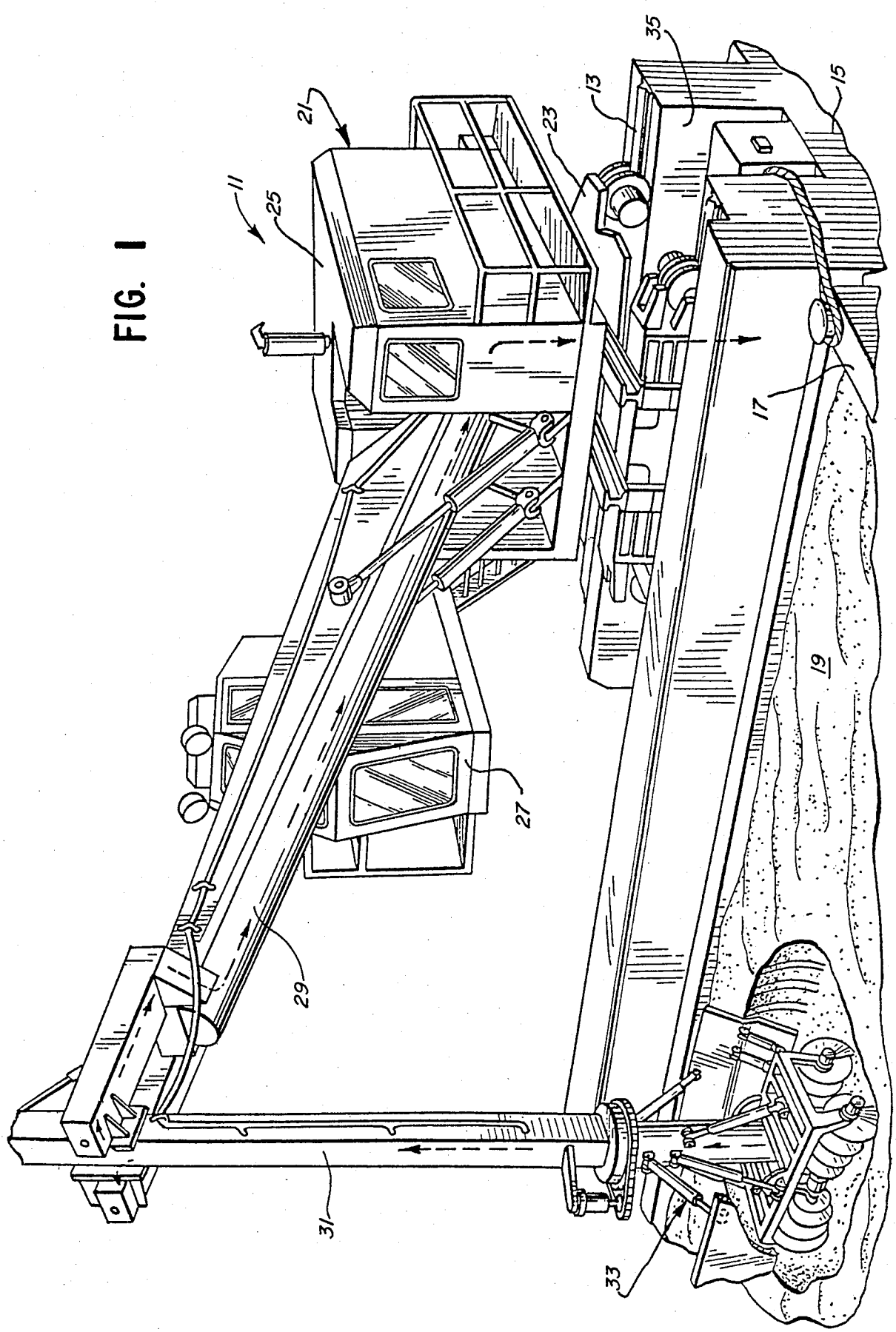
FIG. 1 is a perspective view of an unloading apparatus of the type which uses the present invention. The aforementioned parent copending application Ser. Nos. 672,151 and 581,284 disclose this unloading apparatus in greater detail and their disclosures are incorporated herein by reference.

Turning now to the drawings, FIG. 1 illustrates a material unloading apparatus 11 mounted on two rails 13 of a dock structure 15 for unloading a barge 17 which contains dry cement or other powdered material 19. The unloading apparatus 11 generally comprises: a support means 21 which includes a carriage means 23 for moving the support means on the rails 13 and control apparatus 25 and 27 for controlling the operation of the unloading apparatus; a first conveyor 29 which feeds the dry cement to the support means 21; a second conveyor 31 which feeds the dry cement to the first conveyor 29; and a feeder means 33 for feeding the cement which it collects from the barge 17 into the second conveyor 31. Copending application Ser. No. 672,151 discloses the unloading apparatus 11 in greater detail.

Figure 2:
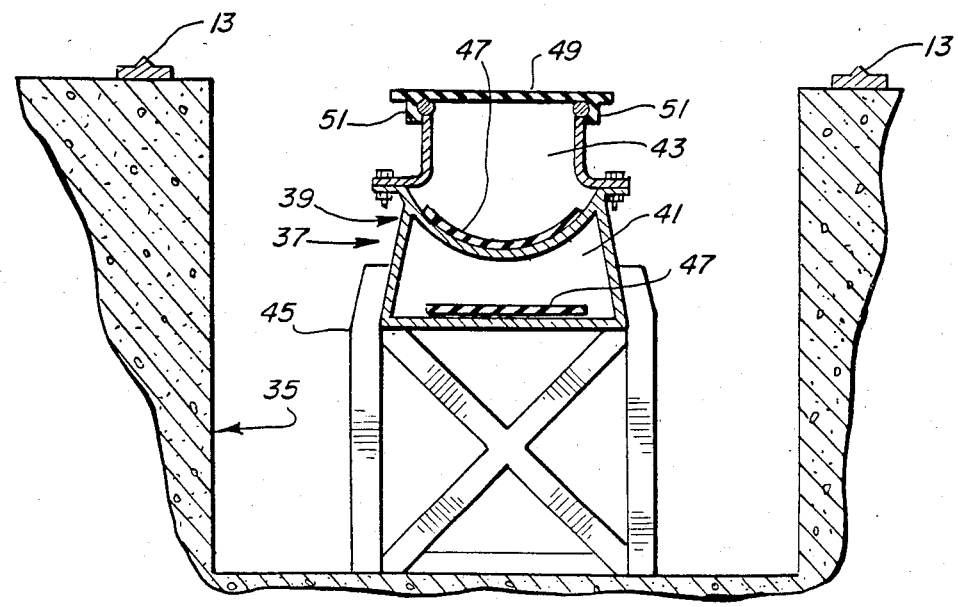
FIG. 2 is a sectional view taken transverse to the longitudinal axis of an elongated rectangular pit over which the unloading apparatus of FIG. 1 moves. This pit contains the conveyor on which the unloading apparatus deposits the bulk material, its housing and a base which supports the conveyor and its housing at a level close to the top of the pit.
Figure 3:
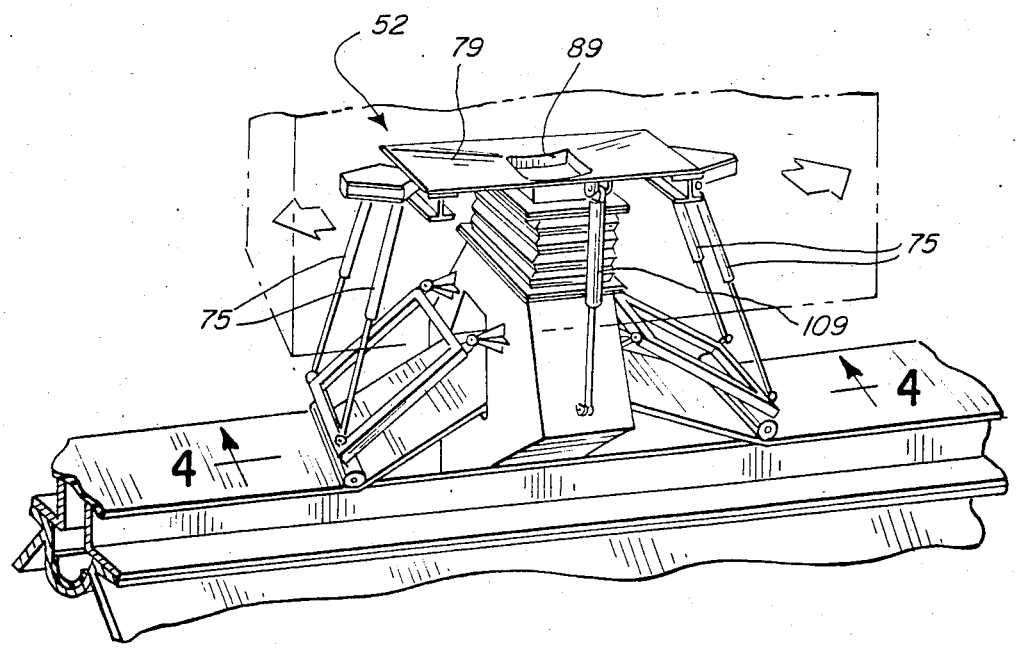
FIG. 3 is a perspective view of a conveyor and discharging apparatus assembly used with the unloading apparatus of FIG. 1, and employing teachings of this invention, some parts being omitted for clarity.

The unloading apparatus 11 moves back and forth on the rails 13 over a channel or pit 35 of the dock structure 15. The channel 35, shown in FIG. 2 as generally rectangular in cross-section, is an elongate opening disposed along an axis generally parallel to the edge of the dock structure 15 and the barge 17. The channel 35 contains a conveyor assembly 37 comprising: a bifurcated conveyor housing 39 defining a lower elongated chamber 41 and an upper elongated chamber 43; and a base structure 45 supporting the conveyor housing 39. The conveyor housing 39 houses an endless conveyor belt 47, often referred to as an endless "jetbelt." The belt 47 receives material in chamber 43 and returns in chamber 41. The housing 39 has an open top, usually kept closed by a flexible cover 49 with interlocking flanges 51 which engage the housing 39 to keep the flexible cover in place. Copending application Ser. No. 581,284 discloses the conveyor assembly 37 in greater detail.

The unloading apparatus 11 deposits the dry cement that it unloads from the barge 17 on the belt 47 in the chamber 43 of the housing 39. It does so using the material transfer assembly 52 shown in FIGS. 3-6 which includes a discharge guide mechanism 53 also described in copending application Ser. No. 581,284. In operation, the discharge guide mechanism 53 displaces the flexible cover 49 at localized areas and deposits the dry cement on the belt 47 under the cover 49. It generally comprises a vertical chute 55 for directing the dry cement into the conveyor housing 39 around the edges of cover 49 and onto the conveyor belt 47, and an elongated horizontal shroud 57 for displacing the flexible cover 49 from the conveyor housing 39 and replacing it back into position. The vertical chute 55 is a bifurcated enclosure with an open top and with two legs 59 communicating with the horizontal shroud 57. The chute defines an opening 61 between the legs for passage of the raised cover 49.

The elongated shroud 57 suspended over the conveyor belt 47 and having its bottom portion disposed within the chamber 43 of conveyor housing 39 serves, as stated above, to progressively displace and then replace the flexible cover of the housing 39 as the discharge guide mechanism moves along the conveyor and deposits dry cement onto the conveyor belt 47. The shroud has rollers 63 disposed in recess 65 and 67 formed into its top wall. The flexible cover 49 rides on these rollers over the shroud and through the opening 61.

The discharge guide mechanism 53 includes two roller assemblies 69 disposed at opposite ends of the guide mechanism. The assemblies 69 function to hold or press the cover 49 down into interlocking relation with the conveyor housing 39. They include a frame 71 having one end pivotally mounted to the vertical chute 55 and having a roller 73 rotatably mounted to its opposite end. The roller 73 engages the flexible cover 49 and transmits the pressure supplied by two hydraulic rams 75 to the cover 49 to hold or push the cover down. The rams 75 have a first end pivotally connected to the outer end of the frame 71 supporting the roller 73 and a second end pivotally connected to a bracket or plate 93 which is secured to a cross-beam 87 of the carriage means 23. As shown in application Ser. No. 581,284, the rams 75 may have their second ends pivotally connected to the vertical chute 55 rather than the bottom of the carriage mean 23.

Support flanges 77 (See FIGS. 5 and 6) secured at a predetermined elevation on the shroud 57 on each side of each end of the shroud function to maintain alignment between the conveyor housing 39 and the shroud 57. Each flange 77 has a longitudinal guide groove formed in its bottom for sliding engagement with a guide rail 78 along the respective top edge of the conveyor housing to keep the guide mechanism 53 centered in chamber 43 of the conveyor housing 39. In addition to maintaining alignment between the shroud and the conveyor housing 39, this insures that flexible sealing flaps 80 on each side of the shroud portion within the conveyor housing will stay in flexible contact with the conveyor side walls to maintain a sliding dust seal between the walls and the shroud. The flanges 77 also act as stops, preventing the discharge guide mechanism from dropping down and contacting the conveyor belt 47.

The material transfer assembly 52 further includes a horizontal baffle plate 79 affixed to the bottom of the carriage means 23; a bellows 81 extending between the baffle plate and the top of the vertical chute 55 and functioning as a conduit for the powdered material; two pulling frames 83 affixed to the carriage means 23 at opposite ends of the baffle plate 79 and two corresponding towing frames 85 affixed to the discharge guide mechanism 53 at opposite ends of the vertical chute 55, each pulling frame 83 connected to a corresponding towing frame 85 by a chain 101 so that the carriage means 23 may tow the discharge guide mechanism 53; and two hydraulic jacks 109 for suspending the discharge guide mechanism 53 from the carriage means 23.

Two spaced cross-beams 87 of the carriage means 23 support the baffle plate 79 above the vertical chute 55. The plate 79 is the floor of a receiving compartment beneath the discharge end of the first conveyor 29 and has an opening 89 through its center with a peripheral configuration similar to the opening at the top of the vertical chute 55. Plate 79 is slightly concave and serves as a funnel to direct the powdered material collected by the unloading apparatus 11 into the opening 89. An integral spout 91 disposed around the opening in the baffle plate extends a short distance downward and defines a downward path for the powdered material.

The bellows 81 has a similar peripheral configuration as that of the opening 89 and the opening at the top of vertical chute 55, and it extends between the spout 91 and the chute 55 to define a flexible conduit between the opening 89 and the opening at the top of chute 55. Appropriate dust-tight connections attach opposite ends of the bellows to the spout and chute. The powdered material flows through this flexible conduit from the unloading apparatus 11 to the discharge guide mechanism 53 which deposits it on the conveyor belt 47. The flexibility provided by the bellows allows relative adjustment movement between the carriage means and the discharge guide mechanism, both laterally and vertically, without interruption of the closed material conduit path and without damaging any related components. Although the preferred embodiment uses a bellows, another apparatus such as a flexible telescoping conduit may also serve the same function and similarly provide the requisite flexibility.

As seen in FIG. 4, the material transfer assembly is symmetric about a vertical axis passing through the center of the bellows 81 and the opening 89. Thus, the discussion below with respect to a pulling frame 83 and a towing frame 85 disposed at one end of the assembly applies to those of the other end.

Each cross-beam 87 also supports a pulling frame 83. The frame 83 includes a top hexagonal plate 93, horizontally disposed and secured to the beam 87. It also has a vertical member 95. This member 95, spaced longitudinally from the respective towing frame 85, affixed to the plate 93, and further secured by cross brace 97, extends downward below the plate 93 to a position a short distance above the shroud 57 at the center of the shroud. The bottom end of this vertical member carries a fitting 99. The towing chain 101 has one of its ends secured to this fitting 99 and the other end secured to a fitting 103 of the towing frame 85, thus connecting the pulling frame 83 with the corresponding towing frame 85. The fitting 103 is at the center line of towing frame 85 and the shroud 57.

The corresponding towing frame 85 has a yoke member 105 with two fingers secured to opposite sides of the shroud 57 and a top portion extending between the two fingers and spanning the top of the shroud to allow the flexible cover to pass through the member 105 and through the discharge guide mechanism 53. Cross-bracing 107 secures the yoke member 105 in place.

In moving back and forth along the rails 13, the carriage means 23 tows the discharge guide mechanism 53 along with it through the flexible tow chains 101. When the carriage means 23 moves, the pulling frames 83, of course, move with it. Thus, referring to FIG. 4, when the carriage means moves to the right, for example, the pulling frame 83 located at the right, pulls the towing chain 101 which tows the discharge guide mechanism 53 to the right by pulling on towing frame 85. When the carriage means 23 moves to the left, the pulling frame 83 and the corresponding chain 101 and towing frame 85 located at the left operate to tow the discharge guide mechanism to the left. The difference in elevation between the fittings 99 and 103 is small enough that the pulling frame 83 imparts, essentially, a horizontal force to the discharge guide mechanism 53. Additionally, since the location of fittings 99 and 103 is generally at the center of the shroud 57, the force that pulling frame 83 imparts is also longitudinal rather than transverse. Having a horizontal, longitudinally directed force prevents disruptive transverse movement of the discharge guide mechanism and contact between it and the conveyor housing 39. Furthermore, the chains 101 have a little slack to provide further flexibility to the material transfer assembly of the present invention and smoothly move the discharge guide mechanism laterally without interruption.

The flanges 77 carry a portion of the weight of the guide mechanism 53 on rails 80 to insure maintenance of guiding engagement between the guide and the rails. However, to reduce the vertical load and wear on these components, a yieldable and flexible support arrangement transfers part of the weight of the discharge guide mechanism 53 directly to the carriage means 23. This support includes two hydraulic jacks 109 (See FIGS. 3 and 5) located on opposite sides of the vertical chute 55. The jacks 109 each have one end pivotally mounted to the baffle plate 79 and the other to the bottom portion of leg 59 of the vertical chute 55. In addition to yieldably suspending the discharge guide mechanism 53 at the proper elevation, the jacks 109 can lift the mechanism vertically out of the conveyor housing 39 when desired.

The horizontally and vertically flexible conduit connection provided by the bellows 81 and the similarly flexible support and towing connections provided by the hydraulic cylinders 109 and tow chains 101 allow for relative adjustment movement between the carriage 23 and the discharge guide 53. This allows the guide 53 to maintain a predetermined, aligned sliding and sealing engagement with the fixed conveyor 39 despite deviations in the movement of the carriage 23 relative to the conveyor, such as due to misalignment of the tracks 13 relative to the conveyor or vice versa, both in plan and in elevation, or due to dirt on the tracks or the like. This avoids the need for precise alignment during an initial installation as well as for many misalignments that can occur during use, such as settling of the grade or accidental displacement of the tracks and/or the conveyor. The assembly will preserve a closed conduit path for transfer of the conveyed material from the carriage to the conveyor throughout with relative movement.

While the above description and the drawing illustrates one preferred embodiment, it will be understood, of course, that the invention is not limited to this embodiment. Those skilled in the art to which the invention pertains may make modifications and other embodiments employing the principles of this invention, particularly upon considering the foregoing teachings. For example, one skilled in the art may vary the position and the number of the hydraulic jacks or use other suspending means to serve their function. In addition, one skilled in the art may also use a cable or other connecting means in place of the connecting chains. Therefore, by the appended claims, it is intended to cover any such modifications and other embodiments as incorporate those features which constitute the essential features of this invention.

What is claimed is:

1. A material transfer assembly comprising: an elongated, fixed conveyor housing; a carriage means disposed above said conveyor housing for receiving bulk material, said carriage means being movable along and above said conveyor housing and including an outlet for discharging bulk material contained within said carriage means; a discharge guide disposed below said carriage means and movable with said carriage means along said conveyor housing, said discharge guide having a bottom portion for engaging said conveyor housing and providing closed communication between said discharge guide and said conveyor housing; connection means for suspending said discharge guide from said carriage means and for moving said discharge guide along with said carriage means, said connection means permitting relative horizontal and vertical movement between said discharge guide and said carriage means; and flexible and extensible conduit means for providing closed communication between said outlet of said carriage means and said discharge guide and thereby transferring the bulk material which discharges from the outlet of said carriage means to said conveyor housing while said carriage means remains stationary over said conveyor housing and while said carriage means is moving along said conveyor housing; said connecting means and said flexible conduit means providing a flexible connection between the carriage means and the discharge guide to allow relative adjustment movement between the carriage means and the discharge guide whereby such relative movement between the discharge guide and the carriage means can occur while maintaining closed communication between the conveyor housing and the carriage means.

2. The material transfer assembly of claim 1, wherein said connection means includes towing means flexibly connecting said carriage means with said discharge guide for pulling said discharge guide along with said carriage means.

3. The material transfer assembly of claim or 2, wherein said discharge guide includes guide means for engaging said conveyor housing.

4. The material transfer assembly of claim 3, wherein said connection means includes a hydraulic jack and said flexible conduit means includes a bellows.

5. The material transfer assembly of claim 2, wherein said towing means includes at least one chain with one end affixed to said carriage means and the other end affixed to said discharge guide.

6. A material transfer assembly comprising an elongated, fixed conveyor housing having two longitudinally extending side walls, a carriage means movable along said conveyor housing and including outlet means for discharging bulk material, a discharge guide movable along said conveyor housing with said carriage means and having a bottom portion disopsed in said conveyor housing between said side walls and providing closed communication therewith, towing means flexibly connecting said carriage means with said discharge guide for pulling said discharge guide along with said carriage means, connection means for suspending said discharge guide from said carriage means and permitting relative movement therebetween, and flexible conduit means providing communication between said outlet means and said discharge guide, whereby said towing means, said connection means, and said flexible conduit means provide a flexible connection for supporting the discharge guide and for transferring bulk material from said carriage means to said conveyor housing as said carriage means is moved along said conveyor housing and moves said discharge guide therewith in engagement with said conveyor housing.

7. The material transfer assembly of claim 6, wherein said discharge guide includes guide means for engaging said conveyor housing.

8. The material transfer assembly of claim 7, wherein said guide means includes at least one flange along each side of said discharge guide for engaging the respective side wall of said conveyor housing.

9. The material transfer assembly of claim 6, wherein said connection means includes a hydraulic jack and said flexible conduit means includes a bellows.

10. The material transfer assembly of claim 6, wherein said towing means includes at least one chain with one end affixed to said carriage means and the other end affixed to said discharge guide.

11. A material transfer assembly disposed between a movable carriage means having a discharge outlet and a subtending elongated, fixed conveyor housing, said material assembly discharging bulk material from said carriage means to said fixed conveyor housing at any point along the housing, said assembly comprising: a discharge guide movable along the fixed conveyor housing with the carriage means and having a bottom portion for engaging the fixed conveyor housing and providing closed communication with the conveyor housing; connection means for suspending the discharge guide from the movable carriage means and for moving the discharge guide with the movable carriage means, the connection means permitting relative horizontal and vertical movement between the discharge guide and the carriage means as said discharge guide maintains closed communication with said conveyor housing; and flexible and extensible conduit means for providing communication between the outlet of the carriage means and the discharge guide whereby the bulk material from the outlet of the carriage means transfer to the discharge guide as the carriage means remains stationary over the conveyor housing or as the carriage means moves along said conveyor housing.

* * * * *

UNITED STATES PATENT AND TRADEMARK OFFICE
CERTIFICATE OF CORRECTION

PATENT NO. : 4,658,948

DATED : April 21, 1987

INVENTOR(S) : Charles P. Miller

It is certified that error appears in the above-identified patent and that said Letters Patent is hereby corrected as shown below:

Column 8, line 25, after claim insert --1--.

Signed and Sealed this

Seventeenth Day of November, 1987

Attest:

DONALD J. QUIGG

*Attesting Officer*  *Commissioner of Patents and Trademarks*